Sept. 17, 1929.  E. PLATTEN ET AL  1,728,697
AUTOMOTIVE VEHICLE HEATER
Filed March 8, 1928  2 Sheets-Sheet 1
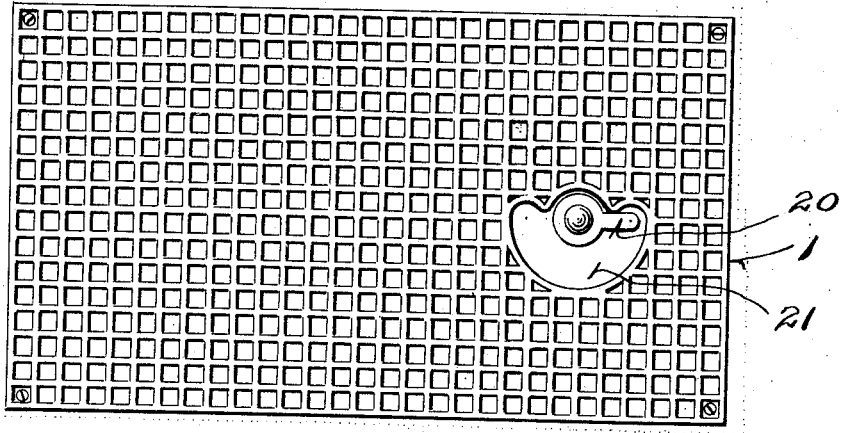
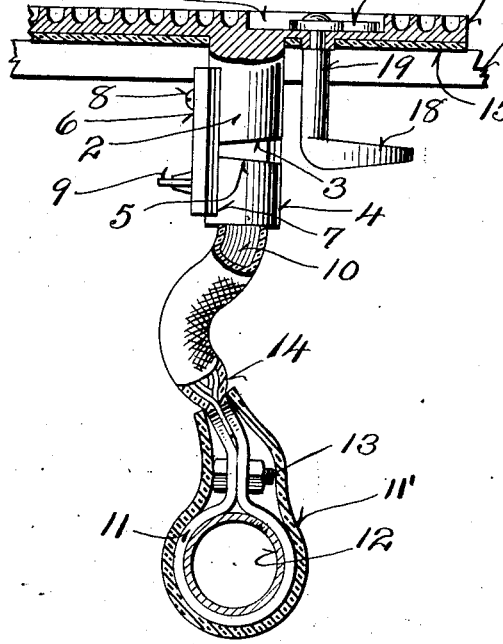
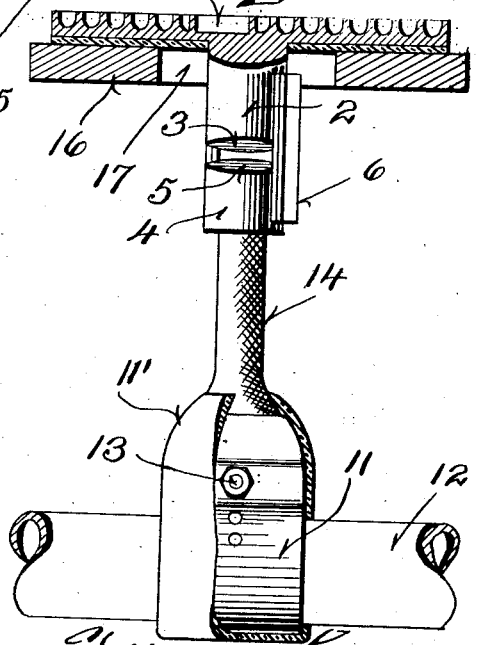
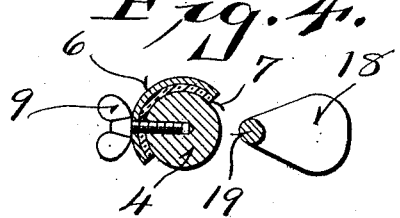
Inventors
W. J. Platten
E. Platten

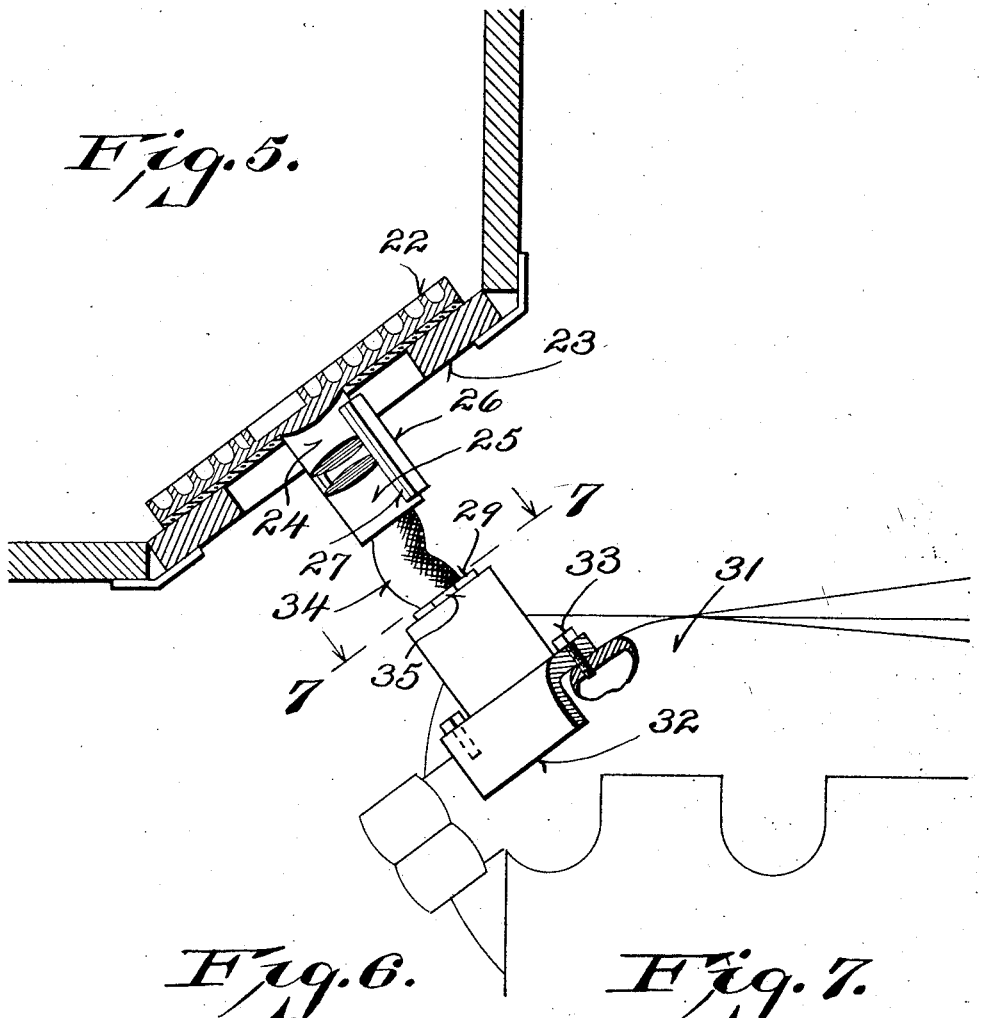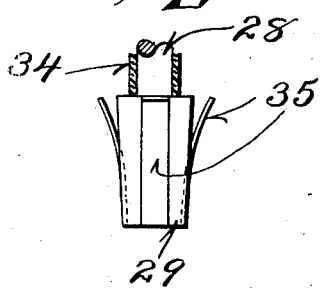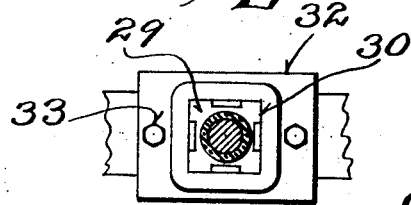

Patented Sept. 17, 1929

1,728,697

UNITED STATES PATENT OFFICE

EMMET PLATTEN AND WILL J. PLATTEN, OF GREEN BAY, WISCONSIN

AUTOMOTIVE-VEHICLE HEATER

Application filed March 8, 1928. Serial No 260,149.

This invention relates to automobile heaters.

Objects of this invention are to provide a novel form of automobile heater in which direct conduction of heat is employed without any intermediate air, gas, or liquid circulation, in which there is no chance for engine odors or gas to enter the car by way of the heater, and in which a very efficient form of heater is provided.

Further objects are to provide an automobile heater in which a floor plate or other type of plate or heating surface may be employed of any desired shape, and which has a capacity for storing heat for a limited period, in which flexible or rigid conductors of any length are employed for directly conducting the heat from the exhaust system or other hot portion of the apparatus to the floor plate, and in which a heat switch controlled from the interior of the car is provided for interrupting the flow of heat to the interior of the car.

Further objects are to provide a very simple and easily produced type of construction which necessitates only a small hole in the floor for its installation, and which is so made that it is easily removed without loosening the connection to the exhaust system.

Embodiments of the invention are shown in the accompanying drawings in which:

Figure 1 is a plan view of the floor plate;

Figure 2 is a sectional view through the floor plate and with other parts in section, showing the connection employed;

Figure 3 is a view corresponding to Figure 2 taken at right angles thereto;

Figure 4 is a detailed view with parts in section showing the construction of heat switch;

Figure 5 is a view of a further form of the invention;

Figure 6 is a detail of the attaching plug;

Figure 7 is a sectional view on the line 7—7 of Figure 5.

Referring to the drawings, it will be seen that a metal floor plate 1 has been provided which may be of any shape whatsoever and which is preferably ribbed to provide increased radiating surfaces. This metal floor plate has an integral downwardly projecting extension 2 which has a tapered lower face 3. Below this extension 2, a similar member or conductor 4 of metal is provided and is similarly equipped with a tapered upper face, indicated by the reference character 5. These members are held together by means of the clip 6 which is thermally insulated therefrom by the asbestos or other insulating sheet 7. If desired, a screw 8 may pass through the clip 6 and into the member 2 and a wing screw 9 may pass through the clip and into the member 4, so that the member 4 may be readily disconnected from the clip when it is desired to remove the floor boards or otherwise alter the arrangement.

A single or plurality of heat conducting members such as copper wires or copper strips, indicated by the reference character 10 are welded or otherwise secured to the block or member 4. At their lower ends, they are welded to a clamp 11 which embraces the exhaust pipe 12 and is tightly clamped thereto by means of the bolt 13. It is preferable to clean the exhaust pipe at the point of attachment so that a metal to metal intimate contact between the clamp 11 and the exhaust pipe is secured. The metals used may, of course, be varied without departing from the spirit of this invention, but it is preferable to make the conductors 10 flexible. These conductors 10 are surrounded by an asbestos or other insulating sheet 14. If desired, the members 2 and 4 may be similarly insulated. Preferably, the clamp 11 is covered by insulation 11'.

It is also to be noted that an asbestos sheet 15 is interposed between the radiator plate 1 and the floor boards 16, a hole 17 being provided in the floor board.

The heat switch comprises a tapered plug or wedge-like member 18 which is rigidly carried by means of a stem 19. The upper end of this stem is connected rigidly to a manipulating handle 20 which is carried preferably within a recessed portion 21 of the radiator plate.

It is apparent that when the parts are in the position shown in Figure 2 that there is a gap between the members 4 and 2, so that heat will not be transmitted from one member to another. However, when the arm 20 is swung to a diametrically opposite position, as viewed in Figure 1, the wedge 18, or block, is slipped into wedging engagement with the faces 3 and 5, and consequently thermally connects the members 2 and 4 and allows heat to be transmitted from one member to the other and to the floor plate.

In operation, the heat is transmitted by direct metallic conduction from the exhaust pipe 12 through the clip 11, through the flexible conductors 10, to the block or conductor 4, through the switch 18, to the block or conductor 2 and directly to the floor plate or radiator plate 1.

In the form shown in Figures 5 to 7, the same inventive idea is employed. A floor plate 22 is carried by the removable floor board 23 and is provided with a projecting portion 24 and an opposed projecting portion 25. These portions are connected by a switch, not shown, similar to the switch 18, previously described. They are held together by means of the plate 26 provided with the insulating sheath 27 which is identical in construction with that previously described. From the portion 24, either a single or a plurality of heat conductors 28 extend forwardly and downwardly and terminate in a plug 29. This plug is slightly tapered and is adapted to fit within the recess 30 formed in a metal block attached to the exhaust manifold 31. This metal block is provided with an extended portion 32 which is secured to the exhaust manifold by means of bolts 33. Obviously, other forms of construction could be employed for the metal block and for attaching the block to the exhaust manifold.

It is to be noted that the conductor or conductors 28 have been shown as covered with an insulating sheath 34. It is to be distinctly understood that the block, and in fact all portions of the apparatus, may be covered with insulation, as desired.

In this last form of the invention, it is to be noted that the device is connected to the exhaust manifold merely by positioning the floor board, sufficient rigidity existing in the conductor 28 to cause the insertion of the plug 29 in the aperture 30 when the device is being repositioned, without any attaching means such as screws or bolts. The plug 29 is provided with a plurality of spring members 35 which, if desired, may be seated within the plug in small channels, as shown for instance in Figure 6, and which are adapted to frictionally bind against the inner walls of the opening 30 in the metal block and thus maintain tight and secure contact for the plug.

This device is eminently suited to the usual types of automobile constructions and may be as readily controlled as the device previously described. It has the additional advantage in that it permits the ready removal and insertion of the floor board 23 without requiring any bolts or nuts for attaching the plug to the heating block carried by the exhaust manifold. Instead the plug is properly positioned due to the rigidity of the conductor 28 which, although somewhat yielding, nevertheless is sufficiently rigid to insure the correct insertion of the tapered plug 29 in the aperture 30 when the floor board is placed in its correct position.

Further, it is to be noted that there is a very short length of conductor between the exhaust manifold and the heating plate and that this conductor directly conducts heat without requiring the circulation of gas, water, or other intermediate heat carrying mediums.

It is to be noted particularly that the term "floor plate" or "radiator plate" is not intended to limit the apparatus to any particular position or shape of the radiator plate. This radiator plate may be placed wherever desired in the car without in any way departing from the spirit of this invention. Further than this, any type of insulation for any of the parts may be employed.

It is also to be noted that any metal may be employed for the several parts, preferably, however, the metal employed is to have a high heat conductivity.

It will be seen, therefore, that a very simple form of automobile heater has been provided by this invention which is easy to install, which is highly efficient in operation, and which heats by a direct conduction of heat from the exhaust system or other hot portion of the automobile.

Although the invention has been described as primarily intended for use on automobiles, nevertheless it is to be distinctly understood that this invention may be applied in other devices. For example, it is adapted to be used in aeroplane constructions for any type of plane.

Although the invention has been described in considerable detail, such description is intended as illustrative rather than limiting as the invention may be variously embodied and as the scope of such invention is to be determined as claimed.

In the claims, it is to be distinctly understood that the expression "automotive vehicles" is intended to cover automobiles, aeroplanes, or other vehicles.

We claim:

1. In an automotive vehicle having a body portion and an exhaust system, the combination of a metallic radiator positioned within the body, a heat conductor providing a metal-to-metal connection between the radiator and a portion of the exhaust system for the direct conduction of heat from the exhaust system to the radiator, and a movable member forming a portion of the connection between the radiator and the exhaust system and adapted to be moved to interrupt the connection between the exhaust system and the radiator.

2. A conduction heater for an automotive vehicle comprising a radiator, a metallic heat conductor adapted for attachment to a portion of the exhaust system, and a movable metallic switch member adapted to establish or interrupt metal-to-metal connection between the conductor and exhaust system.

3. In an automotive vehicle having a body and an exhaust system, the combination of a radiator adapted for positioning within the body, a heat conductor connected between a portion of the exhaust system and the radiator and adapted to supply heat to said radiator by direct conduction from the exhaust system, and means for controlling the conduction of heat.

4. In an automotive vehicle, the combination of an engine having an exhaust manifold, a metallic block directly attached to said exhaust manifold and having an aperture therein, a removable floor board, a radiator carried by said floor board, a relatively stiff metallic heat conductor carried by said radiator, and a terminal plug carried by said conductor and adapted to enter said aperture when said floor board is positioned.

5. In an automotive vehicle, the combination of an engine having an exhaust manifold, a metallic block directly attached to said exhaust manifold and having an aperture therein, a removable floor board, a radiator carried by said floor board, a relatively stiff metallic heat conductor carried by said radiator, and a terminal plug carried by said conductor and adapted to enter said aperture when said floor board is positioned, said plug having a spring adapted to bind against the walls of said aperture.

6. A conduction heater for automotive vehicles comprising a metal radiator adapted for positioning within the vehicle, a metal heat conductor adapted for attachment to a portion of the exhaust system, said conductor having a low thermal resistance, and means for controlling the conduction of heat.

In testimony that we claim the foregoing we have hereunto set our hands at Green Bay, in the county of Brown and state of Wisconsin.

EMMET PLATTEN.
WILL J. PLATTEN.